United States Patent Office 2,801,174
Patented July 30, 1957

2,801,174

PROCESS OF DEHYDRATING MOLASSES

Carlos Vincenty, Rio Piedras, Puerto Rico, assignor to the People of Puerto Rico as represented by the Governor of Puerto Rico No Drawing. Application July 20, 1951,
Serial No. 237,850

4 Claims. (Cl. 99—6)

This invention relates to the dehydration of molasses and more particularly to the production of foods and cattle feed containing dehydrated molasses and yeast.

All previous methods of dehydrating molasses and particularly black-strap molasses have not proved satisfactory because of chemical changes induced by the very high temperatures required for effecting rapid drying and because of unsatisfactory hygroscopic properties inherent in the resulting product.

The extremely high viscosity of molasses makes conventional spreading of films thin enough to achieve rapid dehydration uneconomical. At temperatures above 350° F. the molasses can be dried rapidly, but temperatures of this order destroy the carbohydrates present. An alternative procedure is to dry the molasses under vacuum. By such process a product may be obtained without loss of sugars but the product readily reabsorbs moisture and becomes sticky, thus preventing storage and transportation difficulties.

This invention has as its object the dehydration of molasses in the open at temperatures lower than that at which the carbohydrates present are destroyed. Another object of this invention is the production of a dehydrated molasses which will flake or powder easily. A further object is the manufacture of a powdered dehydrated molasses which will possess satisfactory hygroscopic properties for transportation and long-term storage. A still further object of this invention is the production of a new-type cattle feed concentrate.

These objects are accomplished by the procedure of the present invention, which is described in detail below.

I have found that reducing the effective viscosity of the molasses by mixing with it a material capable of spreading the molasses into very thin films enables the molasses to be dried in a short time at temperatures below which the carbohydrates are destroyed. The resulting product can be flaked or pulverized to give a free-flowing material that can be conveyed by mechanical means or packed into bags for transportation or storage.

The additive material which I have found suitable for this purpose is yeast cream. Yeast cream is the yeast concentrate discharged in the form of cream from the yeast separator. The very finely divided state of the yeast cells serves to disperse the thick molasses and increases its fluidity so that when heated water vapor escapes rapidly at moderate temperatures.

The minimum ratio of yeast cream to molasses is in the range of 30 pounds of yeast cream solids to 70 pounds of molasses solids. Dehydration is uneconomically slow and less effective if smaller proportions of yeast are employed. While there is no limitation on the maximum proportions of yeast cream except those dictated by economic considerations and the undesirability of having excessive quantities of yeast solids present in the final product, I have found that a ratio of more than 70 pounds of yeast cream solids to 30 pounds of molasses solids is not advisable except where yeast is the principal product desired.

Both the yeast cream and the molasses are preferably preheated before being fed onto the drying surface. I have found that preheating the molasses-yeast mixture to a temperature of about 145° F. is satisfactory. This drying surface may be maintained at any temperature below 330° F. and above 150° F. but preferably equivalent to from 60 to 80 pounds of steam, or to temperatures between 307 and 324° F. The actual molasses-yeast mixture remains at a somewhat lower temperature. The time of exposure of the molasses-yeast mixture to the hot drying surface depends upon the composition of the mixture and temperature used, but is generally only a few seconds. The temperature and time of this drying step is thus sufficient that not only has the fermenting enzyme of the yeast been destroyed, but the yeast cells have been killed. While temperatures lower than those specified as preferred may be employed, the time of drying becomes excessive. Drum temperatures which bring the molasses film to a temperature in excess of 330° F. are to be avoided for more than very short periods of time in order to eliminate the possibility of undesirable thermal decomposition.

The following example, which is to be considered as illustrative rather than limiting, will serve to explain the present invention in more detail.

*Example*

Twenty gallons of yeast cream, fresh from the yeast separator and containing 1.3 pounds of yeast solids per gallon or a total of 26 pounds, was heated to 150° F. and added to 7.5 gallons (90 pounds) of blackstrap molasses containing 78% (70 pounds) of dry solids. This composition was maintained at a temperature between 140–150° F. while being mixed and fed to a drum dryer.

The drum dryer was heated by steam at 75 pounds pressure, giving a temperature inside the drum of about 320° F. The diameter of the drum was two feet and drying was conducted at a drum speed of 10 revolutions per minute.

A thin, continuous, and almost completely dehydrated sheet of material was removed by the doctor blade. The final 100 pounds of product contained 70% molasses solids, 26% yeast solids and 4% moisture. This material could be easily flaked or pulverized to give a free-flowing dried material capable of long-term storage or facile transportation.

The moisture content remaining in the finished product may range from 2 to 10% by weight. Below 2% moisture, the material is unsuitable as a stock feed and above 10% moisture, the material will not flake or pulverize satisfactorily. The preferred moisture range is between 3 and 5%.

The process disclosed in this invention makes possible the general use of a cheap material such as blackstrap molasses combined with yeast cream for a nutritious and easily handled stock feed.

I claim:

1. The process for dehydrating molasses which comprises mixing molasses with a quantity of fluid yeast cream sufficient to reduce the viscosity of the molasses to provide a free-flowing liquid mixture, the ratio of yeast solids to molasses solids in said mixture being between 30:70 and 70:30, said mixing being carried out at an elevated temperature not in excess of 150° F., passing the heated mixture continuously over a moving drying surface in the form of a thin film maintained at a temperature not in excess of about 330° F. but high enough to destroy the enzymes of the yeast and to kill the yeast cells, until the moisture content has been reduced to between 2% and 10%, and a friable product is obtained, and then removing said dry product from said drying surface, said mixing and drying being carried out in the absence of fermentation.

2. The process in accordance with claim 1, wherein the temperature at which said thin film is maintained is between 215° F. and 330° F.

3. The process in accordance with claim 1, wherein the temperature at which said mixing is carried out is between 140° F. and 150° F.

4. The process in accordance with claim 1, wherein both said molasses and said yeast cream are heated prior to said mixing.

References Cited in the file of this patent
UNITED STATES PATENTS

| | | |
|---|---|---|
| 1,596,983 | Mackintosh | Aug. 24, 1926 |
| 2,377,008 | Heuser | May 29, 1945 |